(12) United States Patent
Liao et al.

(10) Patent No.: US 10,736,101 B2
(45) Date of Patent: Aug. 4, 2020

(54) FLEXIBLE FRAME STRUCTURE FOR OFDM SYSTEMS

(71) Applicant: MEDIATEK INC., Hsinchu (TW)

(72) Inventors: Pei-Kai Liao, Nantou County (TW); Tao Chen, Beijing (CN); Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 10 days.

(21) Appl. No.: 16/127,533

(22) Filed: Sep. 11, 2018

(65) Prior Publication Data

US 2019/0014576 A1 Jan. 10, 2019

Related U.S. Application Data

(63) Continuation of application No. PCT/CN2017/076898, filed on Mar. 16, 2017.

(Continued)

(51) Int. Cl.
*H04W 72/04* (2009.01)
*H04L 5/14* (2006.01)
(Continued)

(52) U.S. Cl.
CPC ....... *H04W 72/0446* (2013.01); *H04L 1/1861* (2013.01); *H04L 5/0092* (2013.01);
(Continued)

(58) Field of Classification Search
CPC .......... H04W 72/0446; H04W 72/042; H04W 72/1205; H04L 1/1861; H04L 5/0092; H04L 1/1469; H04L 27/2601
(Continued)

(56) References Cited

U.S. PATENT DOCUMENTS

2003/0117980 A1* 6/2003 Kim ................. H04W 36/0094
370/332
2005/0163076 A1* 7/2005 Vannithamby ...... H04W 72/005
370/329

(Continued)

FOREIGN PATENT DOCUMENTS

CN 102740477 A 3/2011
CN 103916957 A 1/2013
(Continued)

OTHER PUBLICATIONS

EPO, Search Report for the EP application 17765854.9 dated Jun. 14, 2018 (11 pages).

(Continued)

*Primary Examiner* — Phong La
(74) *Attorney, Agent, or Firm* — Impreium Patent Works; Zheng Jin

(57) ABSTRACT

A flexible radio frame structure for both FDD and TDD is proposed. Under the flexible frame structure, each radio frame consists of a plurality of slots, and each slot within a radio frame has a flexible slot type. As a basic scheduling unit, each slot can be configured by the base station via physical layer signaling. The slot type can be changed dynamically based on current system needs to support different DL/UL ratios and latency requirements. With the support of different slot types and asynchronous DL/UL HARQ operation, HARQ operation for DL/UL can share the same HARQ timing to simplify the system design and reduce implementation complexity.

18 Claims, 11 Drawing Sheets

| SLOT TYPE | Format | Detailed Description |
|---|---|---|
| 1 | 2 | 1 TTI/ SLOT ; Indicated by DL PHY signaling; All DL; |
| 2 | 2 | 1 TTI/ SLOT ; Indicated by UL scheduler; All UL; |
| 3 | 2 | 1 TTI/ SLOT ; Indicated by DL PHY signaling; DL: 12 or 10 OFDM symbols GP: 1 OFDM symbol (17.84/20.84 $\mu$s) UL: 1 OFDM symbol |
| 4 | 2 | 1 TTI/ SLOT ; Indicated by DL PHY signaling; DL: 1/2 OFDM symbols GP: 1 OFDM symbol (17.84/20.84 $\mu$s) UL: 12/11 or 10/9 OFDM symbols |

Related U.S. Application Data

(60) Provisional application No. 62/309,993, filed on Mar. 18, 2016.

(51) Int. Cl.
*H04W 72/12* (2009.01)
*H04L 5/00* (2006.01)
*H04L 1/18* (2006.01)
*H04L 27/26* (2006.01)

(52) U.S. Cl.
CPC ........ *H04L 5/1469* (2013.01); *H04L 27/2601* (2013.01); *H04W 72/042* (2013.01); *H04W 72/1205* (2013.01); *H04L 5/0051* (2013.01); *H04L 5/0055* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2011/0149813 A1* | 6/2011 | Parkvall | ............... | H04B 7/2656 370/280 |
| 2013/0039193 A1* | 2/2013 | Yin | ................... | H04W 72/0486 370/252 |
| 2013/0051504 A1 | 2/2013 | Chen | ............................ | 375/343 |
| 2013/0188569 A1* | 7/2013 | He | ........................ | H04W 28/16 370/329 |
| 2013/0195066 A1* | 8/2013 | Lee | ........................ | H04W 52/04 370/329 |
| 2013/0235817 A1 | 9/2013 | Wu | ............................... | 370/329 |
| 2013/0336252 A1 | 12/2013 | Hsieh et al. | ................... | 370/329 |
| 2014/0029486 A1 | 1/2014 | Li et al. | ........................ | 370/280 |
| 2016/0020891 A1 | 1/2016 | Jung et al. | .................... | 370/280 |
| 2016/0044615 A1* | 2/2016 | Bashar | ...................... | H04L 5/14 370/280 |
| 2016/0302099 A1* | 10/2016 | Kim | ....................... | H04W 24/00 |
| 2017/0223702 A1* | 8/2017 | Yin | ....................... | H04L 1/1812 |
| 2017/0280467 A1* | 9/2017 | Zhu | ................... | H04W 72/0426 |
| 2018/0110043 A1* | 4/2018 | Shi | ............................ | H04W 4/70 |
| 2018/0278373 A1* | 9/2018 | Wang | .................... | H04L 1/1812 |

FOREIGN PATENT DOCUMENTS

| | | |
|---|---|---|
| CN | 103974424 A | 1/2013 |
| TW | 201310952 A | 8/2011 |
| TW | 201338483 A | 3/2012 |
| TW | 201351907 A | 6/2012 |
| TW | 201401902 A | 6/2012 |

OTHER PUBLICATIONS

RWS-150009, 3GPP RAN Workshop on 5G, Ericsson, "5G—Key Component of the Networked Society", Phoenix, AZ, USA, Sep. 17-18, 2015 (55 pages). *p. 33-p. 34*.

RWS-150051, 3GPP RAN workshop on 5G, NTT Docomo, Inc., "5G Vision for 2020 and Beyond", Phoenix, AZ, USA, Sep. 17-18, 2015 (23 pages). *p. 17*.

International Search Report and Written Opinion of International Search Authority for PCT/CN2017/076898 dated May 22, 2017 (11 pages).

Taiwan IPO, Search Report for the TW application 106108680 (no English translation is available) dated Oct. 24, 2018 (7 pages).

* cited by examiner

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

(PRIOR ART)

FIG. 1

With HARQ-ACK Bundling for 2 DL Subframes

FLEXIBLE FRAME STRUCTURE FOR OFDM SYSTEMS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2017/076898, with an international filing date of Mar. 16, 2017, which in turn claims priority from U.S. Provisional Application No. 62/309,993 filed on Mar. 18, 2016. This application is a continuation of International Application No. PCT/CN2017/076898, which claims priority from U.S. Provisional Application Nos. 62/309,993. International Application No. PCT/CN2017/076898 is as of the filing date of this application, and the United States is a designated state in International Application No. PCT/CN2017/076898. This application claims the benefit under 35 U.S.C. § 119 from U.S. Provisional Application Nos. 62/309,993. The disclosure of each of the foregoing documents is incorporated herein by reference.

TECHNICAL FIELD

The present invention relates generally to wireless communication systems and, more particularly, to flexible frame structure for OFDM systems.

BACKGROUND

In wireless communication systems, such as defined by 3GPP Long Term Evolution (LTE/LTE-A) specification, user equipments (UE) and base stations (eNodeB) communicate with each other by sending and receiving data carried in radio signals according to a predefined radio frame format. Typically, the radio frame format contains a sequence of radio frames, each radio frame having the same frame length with the same number of subframes. The subframes are configures to perform uplink (UL) transmission or downlink (DL) reception in different Duplexing methods. Time-division duplex (TDD) is the application of time-division multiplexing to separate transmitting and receiving radio signals. TDD has a strong advantage in the case where there is asymmetry of the uplink and downlink data rates. Seven different TDD configurations are provided in LTE/LTE-A systems to support different DL/UL traffic ratios for different frequency bands.

FIG. 1 (Prior Art) illustrates the TDD mode UL-DL configurations in an LTE/LTE-A system. Table 100 shows that each radio frame contains ten subframes, D indicates a DL subframe, U indicates an UL subframe, and S indicates a Special subframe/Switch point (SP). Each SP contains a DwPTS (Downlink pilot time slot), a GP (Guard Period), and an UpPTS (Uplink pilot time slot). DwPTS is used for normal downlink transmission and UpPTS is used for uplink channel sounding and random access. DwPTS and UpPTS are separated by GP, which is used for switching from DL to UL transmission. The length of GP needs to be large enough to allow the UE to switch to the timing advanced uplink transmission. These allocations can provide 40% to 90% DL subframes. Current UL-DL configuration is broadcasted in the system information block, i.e. SIB1. The semi-static allocation via SIB1, however, may or may not match the instantaneous traffic situation. Currently, the mechanism for adapting UL-DL allocation is based on the system information change procedure.

In 3GPP LTE Rel-11 and after and 4G LTE, the trend of the system design shows the requirements on more flexible configuration in the network system. Based on the system load, traffic type, traffic pattern and so on, the system can dynamically adjust its parameters to further utilize the radio resource and to save the energy. One example is the support of dynamic TDD configuration, where the TDD configuration in the system may dynamically change according to the DL-UL traffic ratio.

The Next Generation Mobile Network (NGMN) Board, has decided to focus the future NGMN activities on defining the end-to-end (E2E) requirements for 5G. Three main applications in 5G include enhanced Mobile Broadband (eMBB), Ultra-Low Latency services (ULL), and massive Machine-Type Communication (MTC) under milli-meter wave technology, small cell access, and unlicensed spectrum transmission. Specifically, the design requirements for 5G includes maximum cell size requirements and latency requirements. The maximum cell size is urban micro cell with inter-site distance (ISD)=500 meters, i.e. cell radius is 250~300 meters. For eMBB, the E2E latency requirement is <=10 ms; for ULL, the E2E latency is <=1 ms. Furthermore, multiplexing of eMBB & ULL within a carrier should be supported, and TDD with flexible uplink and downlink (UL/DL) ratio is desirable.

Under the existing LTE TDD frame structure, which subframe can be UL or DL is fixed within a radio frame. As depicted in FIG. 1, the latency for HARQ-ACK is 4~6 ms. Also, there is up to 9 ms latency between UL sounding and DL transmission. Even under dynamic TDD configuration, the TDD configuration can only change every 10 ms (one radio frame). Such latency performance obviously cannot meet the 5G requirements. A new flexible frame structure is sought to meet the 5G requirements.

SUMMARY

A flexible radio frame structure for both frequency division duplex (FDD) and time division duplex (TDD) is proposed. Under the flexible frame structure, each radio frame consists of a plurality of slots, and each slot within a radio frame has a flexible slot type. As a basic scheduling unit, each slot can be configured by the base station via physical layer signaling. The slot type can be changed dynamically based on current system needs to support different DL/UL ratios and latency requirements. With the support of different slot types and asynchronous DL/UL HARQ operation, HARQ operation for DL/UL can share the same HARQ timing to simplify the system design and reduce implementation complexity.

In one embodiment, a UE receives a physical layer signaling from a base station in a mobile communication network. The UE exchanges data with the base station according to a predefined radio frame format, each radio frame comprises a plurality of slots, and each slot is a basic scheduling unit comprising a predefined number of OFDM symbols. The UE determines one or more slot types associated with corresponding one or more slots from the physical layer signaling. The UE performs data reception and/or transmission in the one or more slots based on the determined one or more slot types. The one or more slots include at least a schedule slot associated with a scheduled slot type.

In another embodiment, a base station determines one or more slot types associated with corresponding one or more slots for a user equipment (UE) in a mobile communication network. The base station exchanges data with the UE according to a predefined radio frame format, each radio frame comprises a plurality of slots, and each slot is a basic scheduling unit comprising a predefined number of OFDM symbols. The base station transmits a physical layer signaling indicating the one or more slot types to the UE. The base station performs data transmission and/or reception in the one or more slots based on the indicated one or more slot types. The one or more slots include at least a schedule slot associated with a scheduled slot type.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 (Prior Art) illustrates the TDD mode UL-DL configurations in an LTE/LTE-A system.

DETAILED DESCRIPTION

Reference will now be made in detail to some embodiments of the invention, examples of which are illustrated in the accompanying drawings.

Figure 2:
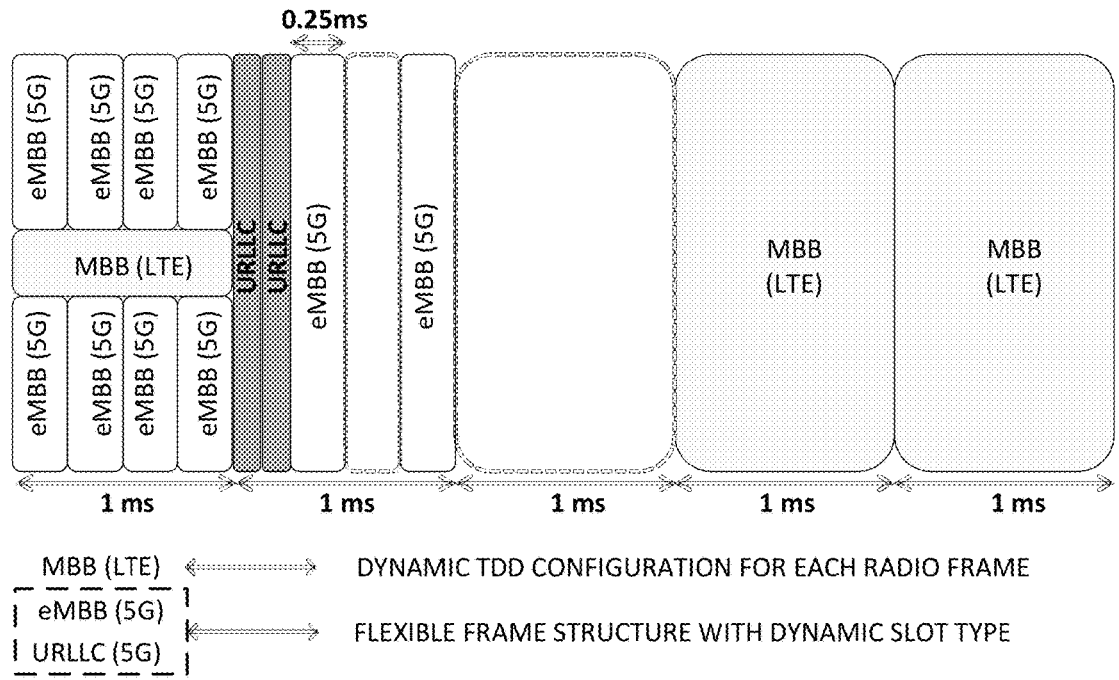
FIG. 2 illustrates a mobile communication system with flexible FDD and TDD radio frame structure in accordance with one novel aspect.

FIG. 2 illustrates a next generation 5G mobile communication system with flexible FDD and TDD radio frame structure in accordance with one novel aspect. The Next Generation Mobile Network (NGMN) Board, has decided to focus the future NGMN activities on defining the end-to-end (E2E) requirements for 5G. Three main applications in 5G include enhanced Mobile Broadband (eMBB), Ultra-Reliability & Low Latency Communications (URLLC), and massive Machine-Type Communications (mMTC) considering spectrum up to 100 GHz for both licensed and unlicensed frequency bands. Specifically, the performance requirements for 5G include peak data rate and latency requirements. For eMBB, the target of peak data rate is 20 Gbps in downlink and 10 Gbps in uplink. For eMBB, the E2E latency requirement is <=10 ms; for URLLC, the E2E latency is <=1 ms. The considered deployment scenarios for 5G include at least indoor hotspot, dense urban (including macro-cells with inter-site distance=200 meters and small cells), urban macro (including macro-cells with inter-site distance=500 meters) & rural macro (including macro-cells with inter-site distance=1732 or 5000 meters).

Furthermore, multiplexing of different services of MBB, eMBB, URLLC, and massive MTC within a carrier should be supported, and TDD with flexible uplink and downlink (UL/DL) ratio is desirable. As depicted in FIG. 2, multiplexing of MBB (LTE), eMBB (5G) and URLLC (5G) is considered. However, under the existing LTE TDD frame structure, the latency performance cannot meet the 5G performance requirements. In accordance with one novel aspect, a flexible radio frame structure for both FDD and TDD is proposed. Under the flexible frame structure, each radio frame consists of a plurality of slots, and each slot within a radio frame has a flexible slot type (i.e. the configuration of DL & UL ratio in each slot can be changed flexibly). As a basic scheduling unit, each slot can be indicated to a UE by the base station via DL physical layer signaling so that the slot type in each slot can be changed dynamically based on current system needs to support different DL/UL ratios and meet 5G latency requirements. The physical layer signaling can be a broadcast, multi-cast or unicast signaling. The physical layer signaling can be same-slot indication (i.e. physical layer signaling in slot N indicates the slot type of slot N) or cross-slot indication (i.e. physical layer signaling in slot N indicates the slot type of slot N+K, where K≥1). With the support of different slot types and asynchronous DL/UL HARQ operation, HARQ operation for DL/UL can share the same HARQ timing to simplify the system design and reduce implementation complexity.

Figure 3:
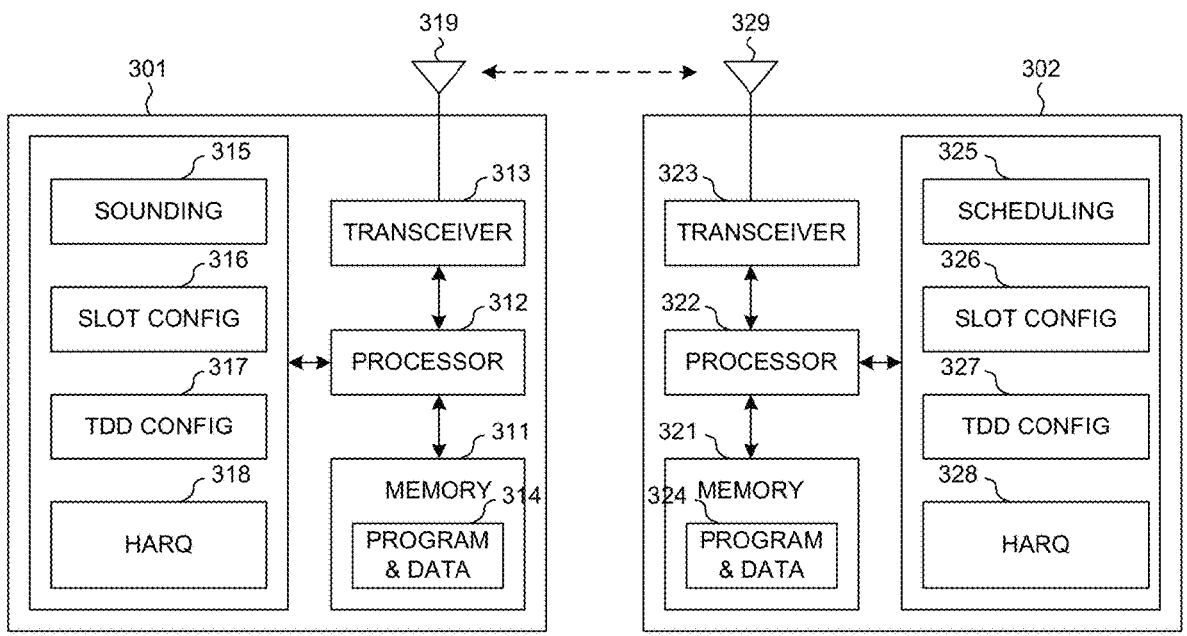
FIG. 3 is a simplified block diagram of a user equipment and a base station with flexible radio frame structure in accordance with one novel aspect.

FIG. 3 is a simplified block diagram of a user equipment UE 301 and a base station eNB 302 with flexible FDD and TDD radio frame structure in accordance with one novel aspect. UE 301 comprises memory 311, a processor 312, an RF transceiver 313, and an antenna 319. RF transceiver 313, coupled with antenna 319, receives RF signals from antenna 319, converts them to baseband signals and sends them to processor 312. RF transceiver 313 also converts received baseband signals from processor 312, converts them to RF signals, and sends out to antenna 319. Processor 312 processes the received baseband signals and invokes different functional and circuits to perform features in UE 301. Memory 311 stores program instructions and data 314 to control the operations of UE 301. The program instructions and data 314, when executed by processor 312, enables UE 301 to receive physical layer configuration for each slot dynamically and to exchange DL/UL control/data with its serving base station based on the configured slot type.

Similarly, eNB 302 comprises memory 321, a processor 322, an RF transceiver 323, and an antenna 329. RF transceiver 323, coupled with antenna 329, receives RF signals from antenna 329, converts them to baseband signals and sends them to processor 322. RF transceiver 323 also converts received baseband signals from processor 322, converts them to RF signals, and sends out to antenna 329. Processor 322 processes the received baseband signals and invokes different functional modules and circuits to perform features in eNB 302. Memory 321 stores program instructions and data 324 to control the operations of eNB 302. The program instructions and data 324, when executed by processor 322, enables eNB 302 to configure slot type dynamically via physical layer signaling and to exchange DL/UL control/data with its served UEs based on the configured slot type.

UE 301 and eNB 302 also comprise various function modules and circuits that can be implemented and configured in a combination of hardware circuits and firmware/software codes being executable by processors 312 and 322 to perform the desired functions. In one example, UE 301 comprises a sounding module 315 that performs uplink sounding for MIMO channel state information measurement, a slot configurator 316 that configures slot type dynamically for 5G systems, a TDD configuration module 317 that determines adaptive TDD configuration for LTE systems, and an HARQ circuit 318 for HARQ and feedback operation. Similarly, eNB 302 comprises a scheduling module 325 that provides downlink scheduling and uplink grant, a slot configurator 326 that configures slot type dynamically for 5G systems, a TDD configuration module 327 that determines adaptive TDD configuration for LTE systems, and an HARQ circuit 328 for HARQ and feedback operation.

Figures 4, 5:
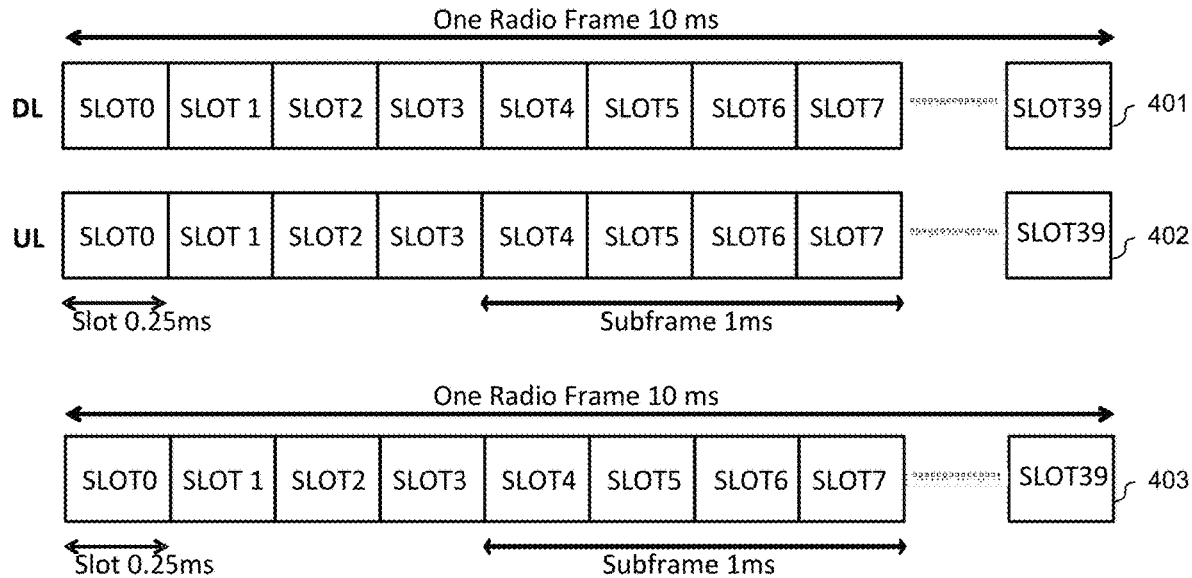
FIG. 4 illustrates one embodiment of FDD and TDD radio frame structure in 5G systems.
FIG. 5 illustrates the different slot types defined for eMBB/ULL in 5G systems.

FIG. 4 illustrates one embodiment of FDD and TDD radio frame structure. In FDD radio frame structure, both full duplex and half duplex are supported. The DL radio frame structure is depicted in 401, the UL radio frame structure is depicted in 402. The TDD radio frame structure is depicted in 403. In the example of FIG. 4 with 60 KHz subcarrier spacing, a radio frame consists of 10 subframes and 40 slots. The time length of a radio frame is 10 ms, the time length of a subframe is 1 ms, and the time length for a slot is 0.25 ms, i.e., 14 OFDM symbols. Keeping 10 ms radio frame length to be the same as LTE can maximize the potential protocol stacks sharing between LTE and 5G and simplify the design of 5G-LTE interworking. For example, UE does not need to obtain 5G system frame number for RACH resources during handover from LTE cell to 5G cell. Each slot within a radio frame is a flexible slot, which can be dynamically configured as one of the supported slot types.

FIG. 5 illustrates an example with four different slot types defined for eMBB/ULL in 5G systems. The following four slots types can be dynamically configured: slot type 1 with all DL (referred to as DL-all), slot type 2 with all UL (referred to as UL-all), slot type 3 with more DL & less UL (referred to as DL-major), and slot type 4 with more UL & less DL (referred to as UL-major). The basic scheduling unit and the basic transmission time interval (TTI) is one slot length. When multiple slots are aggregated, the TTI can be larger than one slot length. In this example, same-slot indication is assumed for the DL PHY layer signaling indicating slot type. For slot type 1, the slot type is indicated by DL PHY layer signaling, and all OFDM symbols of the entire slot is for DL transmission, which includes both DL data and DL control. For slot type 2, the slot type is indicated by UL scheduler, and all OFDM symbols of the entire slot is for UL transmission, which includes both UL data and UL control. For slot type 3, the slot type is indicated by DL PHY layer signaling. Out of the 14 OFDM symbols, 12 OFDM symbols are for DL transmission, 1 OFDM symbol is for guard period (GP), and 1 OFDM symbol is for UL transmission. With slot type 3, there are both DL part (including either DL data only or DL data with DL control) and UL part (including UL control) in the slot. For slot type 4, the slot type is indicated by DL PHY layer signaling. Out of the 14 OFDM symbols, 1 or 2 OFDM symbols are for DL transmission, 1 OFDM symbol is for GP, and 11 or 12 OFDM symbols are for UL transmission. With slot type 4, there are DL part (including DL control) and UL part (including either UL data only or UL data with UL control) in the slot. The GP length is 17.84/20.84 µs, assuming 60 KHz subcarrier spacing, which is sufficient to accommodate UE DL-to-UL switching time, UL-to-DL switching time and UL timing advance. For larger subcarrier spacing, e.g. 120 KHz and 240 KHz, more OFDM symbols are needed for GP to accommodate DL-to-UL switching time, UL-to-DL switching time and UL timing advance. With the support of all four slot types and asynchronous DL/UL HARQ operation, DL/UL HARQ can share the same HARQ timing to simplify the system design and reduce implementation complexity. Other examples with more than four slot types are not precluded in this invention. Except DL-all and UL-all slot types, there could be more than two bi-directional slot types (i.e. slot type 3 and slot type 4 in FIG. 5) to support different system needs.

UL control is TDM with DL part in slot type 3 and UL data in slot type 4, which at least carries: HARQ-ACK for DL data transmission and sounding reference signal for MIMO channel state information measurement. DL control is TDM with UL data in slot type 4, which at least carries: UL grant and HARQ-ACK for UL data transmission. Asynchronous HARQ retransmission is proposed for both FDD and TDD, which can facilitate same HARQ-ACK timing for both FDD and TDD. For reduced overhead of guard period and UL control, bundled HARQ-ACK for multiple DL slots can be applied, e.g., bundled HARQ-ACK for 2 DL slots. Various embodiments are illustrated below with more details.

Figure 6:
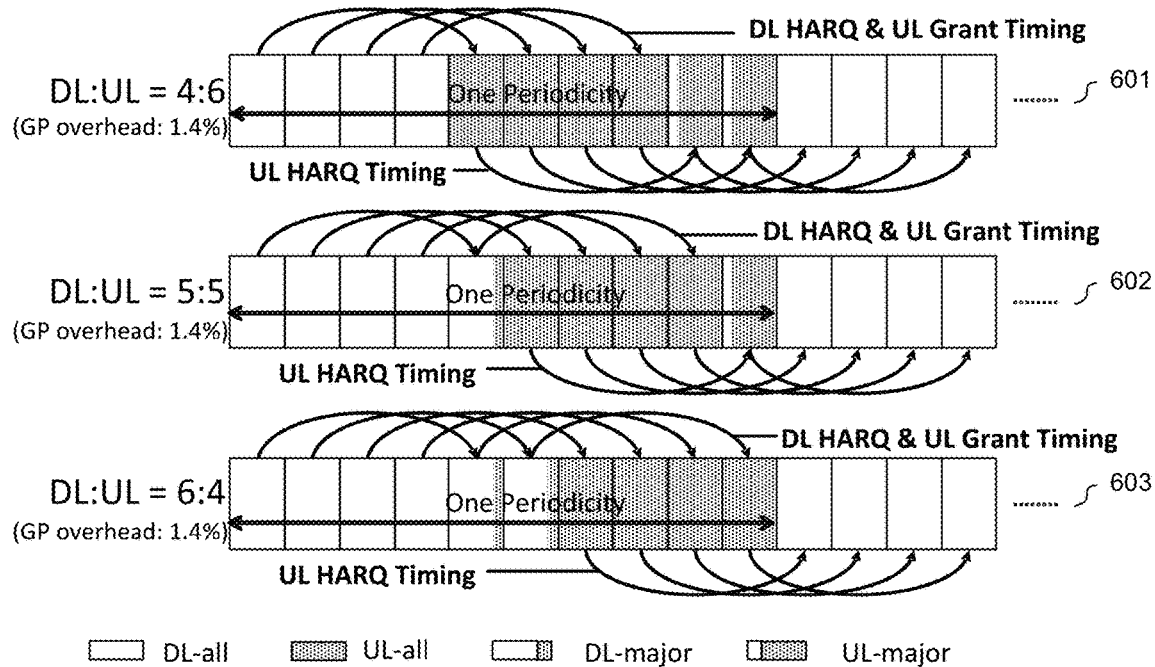
FIG. 6 illustrates a first embodiment of TDD licensed spectrum for eMBB in support of different DL/UL ratios.

FIG. 6 illustrates a first embodiment of TDD licensed spectrum for eMBB in support of different DL/UL ratios. In a first example, as depicted by 601, the DL:UL ratio is 4:6. During one periodicity of 10 slots, 4 slots are DL-all slots, and 6 slots are UL-all slots or UL-major slots. In order to support the same DL/UL HARQ timing for HARQ operation, two of the 6 slots are UL-major slots, and the GP overhead is 1.4%. In a second example, as depicted by 602, the DL:UL ratio is 5:5. During one periodicity of 10 slots, 5 slots are DL-all slots or DL-major, and 5 slots are UL-all slots or UL-major slots. In order to support the same DL/UL HARQ timing for HARQ operation, one of the 5 slots is DL-major slot and one of the 5 slots is UL-major slot, and the GP overhead is 1.4%. In a third example, as depicted by 603, the DL:UL ratio is 6:4. During one periodicity of 10 slots, 6 slots are DL-all slots or DL-major, and 4 slots are UL-all slots. In order to support the same DL/UL HARQ timing for HARQ operation, two of the 6 slots are DL-major slot, and the GP overhead is 1.4%. Note that in the example of FIG. 6, for eMBB service, the supported UL grant timing is 4 TTI, and the DL/UL HARQ-ACK timing is 4 TTI.

Figure 7:
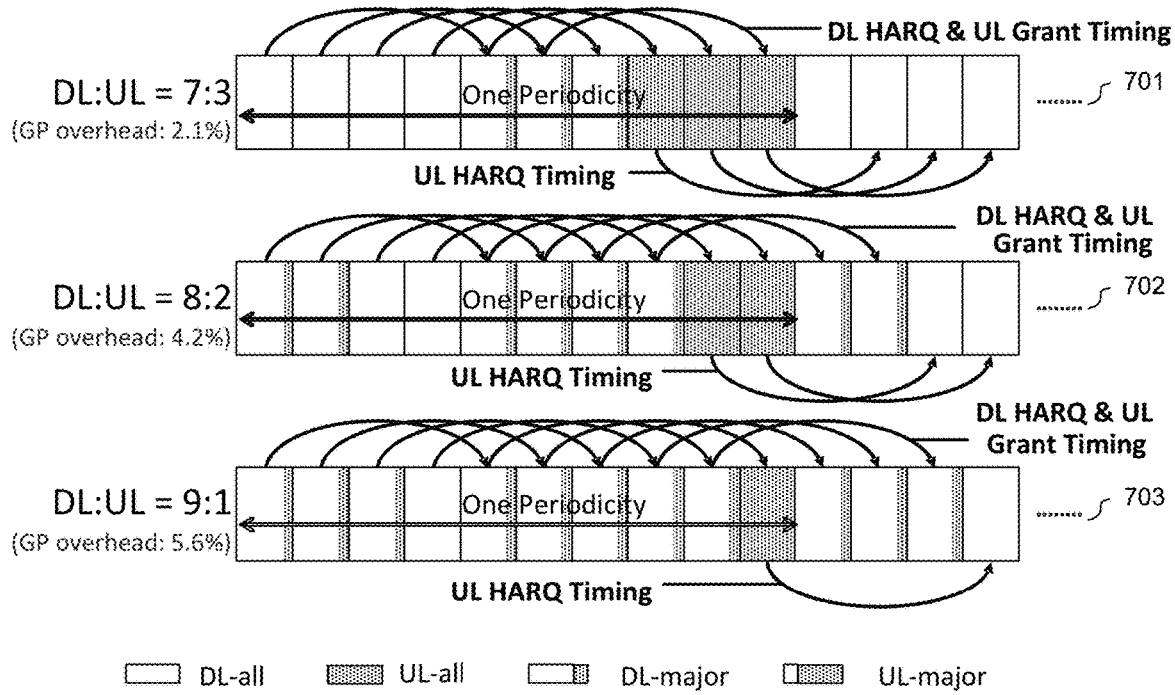
FIG. 7 illustrates a second embodiment of TDD licensed spectrum for eMBB in support of different DL/UL ratios.

FIG. 7 illustrates a second embodiment of TDD licensed spectrum for eMBB in support of different DL/UL ratios. In a first example, as depicted by 701, the DL:UL ratio is 7:3. During one periodicity of 10 slots, 7 slots are DL-all slots or DL-major slots, and 3 slots are UL-all slots. In order to support the same DL/UL HARQ timing for HARQ operation, three of the 7 slots are DL-major slots, and the GP overhead is 2.1%. In a second example, as depicted by 702, the DL:UL ratio is 8:2. During one periodicity of 10 slots, 8 slots are DL-all slots or DL-major slots, and 2 slots are UL-all slots. In order to support the same DL/UL HARQ timing for HARQ operation, six of the 8 slots are DL-major slots, and the GP overhead is 4.2%. In a third example, as depicted by 703, the DL:UL ratio is 9:1. During one periodicity of 10 slots, 9 slots are DL-all slots or DL-major slots, and one slot is UL-all slot. In order to support the same DL/UL HARQ timing for HARQ operation, eight of the 9 slots are DL-major slots, and the GP overhead is 5.6%. In the example of FIG. 7, for eMBB service, the UL grant timing is 4 TTI, and the DL/UL HARQ-ACK timing is 4 TTI.

Figure 8:
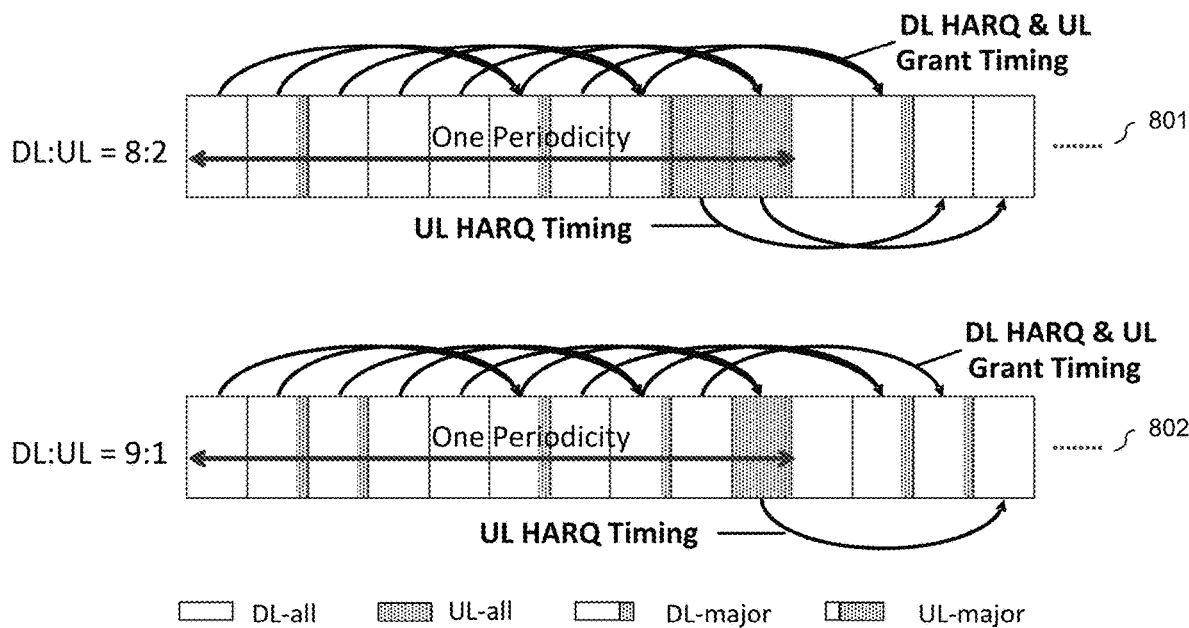
FIG. 8 illustrates a third embodiment of TDD licensed spectrum for eMBB in support of different DL/UL ratios.

FIG. 8 illustrates a third embodiment of TDD licensed spectrum for eMBB in support of different DL/UL ratios. In a first example, as depicted by 801, the DL:UL ratio is 8:2. During one periodicity of 10 slots, 8 slots are DL-all slots or DL-major slots, and 2 slots are UL-all slots. In order to support the same DL/UL HARQ timing for HARQ operation, and also to reduce GP overhead, only three of the eight slots are DL-major slots. However, for two consecutive downlink slots, they share the same uplink part for HARQ-ACK. As a result, the same UL grant timing and DL/UL HARQ timing can be supported. In a second example, as depicted by 802, the DL:UL ratio is 9:1. During one periodicity of 10 slots, 9 slots are DL-all slots or DL-major slots, and one slot is UL-all slot. In order to support the same DL/UL HARQ timing for HARQ operation, and also to reduce GP overhead, only four of the nine slots are DL-major slots. However, for two consecutive downlink slots, they share the same uplink part for HARQ-ACK. As a result, the same UL grant timing and DL/UL HARQ timing can be supported.

Figure 9:
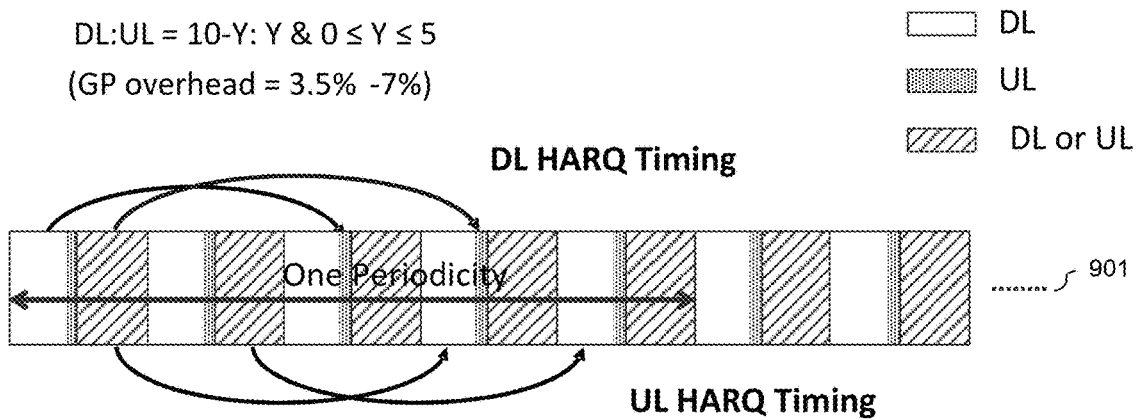
FIG. 9 illustrates a fourth embodiment of TDD licensed spectrum for eMBB in support of flexible DL/UL ratios.

FIG. 9 illustrates a fourth embodiment of TDD licensed spectrum for eMBB in support of flexible DL/UL ratios. In this embodiment, one type 3 (DL-major) or type (DL-all) slots every two slots is assumed as the fixed slots. The remaining of the slots are flexible slots. CSI/RRM measurements are assumed in the DL part of the fixed slots. The flexible slots are implicitly indicated by the scheduling, which can be either DL or UL. In one example, the flexible slots are assumed by UE as UL-all slots for power saving. Under this embodiment, different DL/UL ratios can be supported, and the GP overhead ranges from 3.5% to 7%. Furthermore, the same UL grant timing and HARQ timing can be supported.

Figure 10:
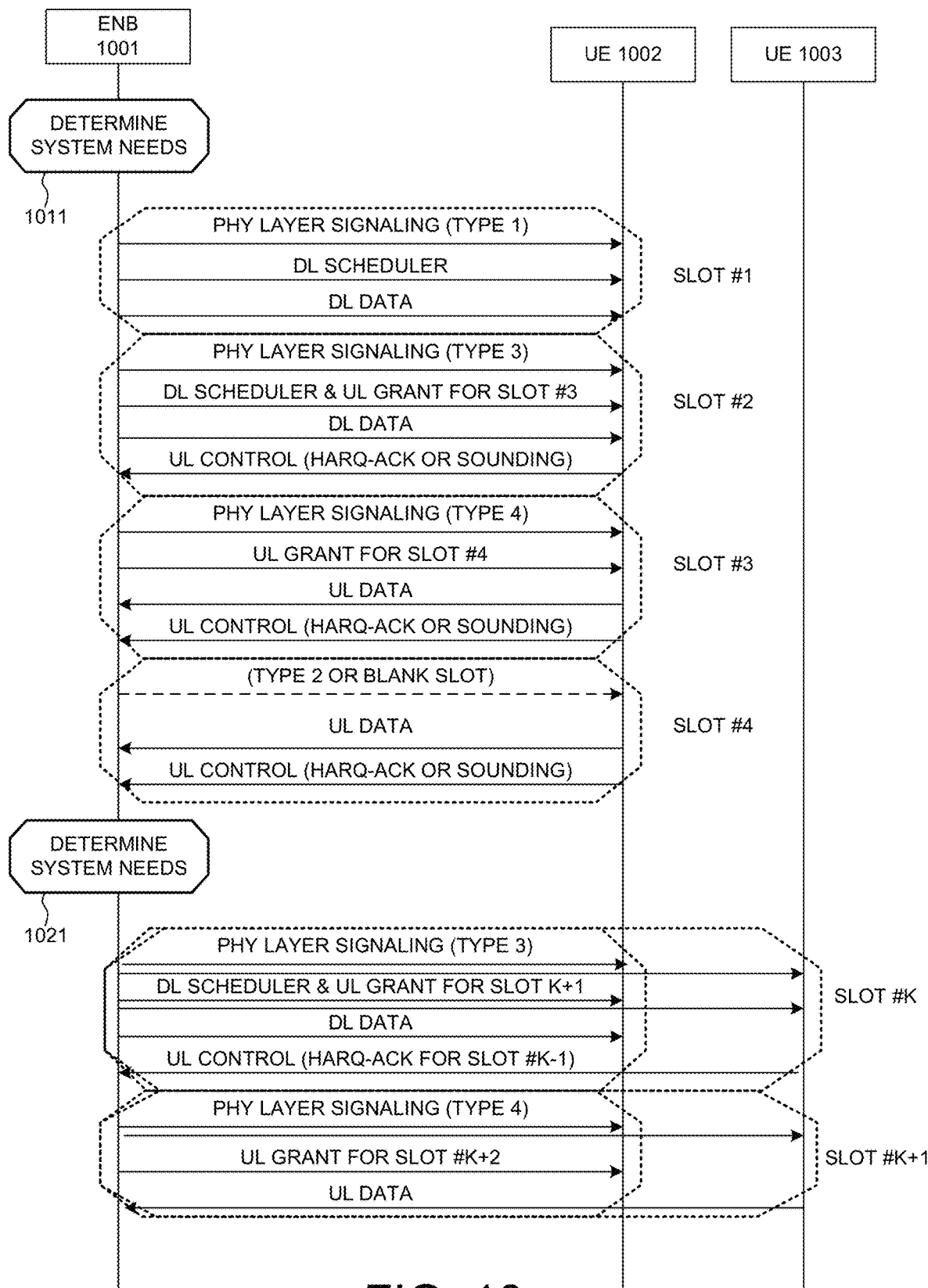
FIG. 10 is a sequence flow between a base station and UEs for dynamically changing frame structure based on current system needs.

FIG. 10 is a sequence flow between a base station and UEs for dynamically changing frame structure based on current system needs. In this example, same-slot indication is assumed for the DL PHY layer signaling indicating slot type. In step 1011, eNB 1001 determines the current system needs, e.g., DL/UL radio, latency requirements, etc. and thereby determining the subsequent slot types accordingly. For example, in slot #1, eNB 1001 sends a DL PHY signaling in DL control region to notify UE 1002 that the slot type is type 1 (DL-ALL). In slot #1, eNB 1001 also transmits a DL scheduler and corresponding DL data to UE 1002. In slot #2, eNB 1001 sends a DL PHY signaling in DL control region to notify UE 1002 that the slot type is type 3 (DL-MAJOR). In slot #2, eNB 1002 transmits an UL grant for slot #3, a DL scheduler and corresponding DL data to UE 1002, as well as receives UL control (e.g., HARQ-ACK for DL, UL sounding) from UE 1002. In slot #3, eNB 1001 sends a DL PHY signaling in DL control region to notify UE 1002 the slot type is type 4 (UL-MAJOR). In slot #3, eNB transmits UL grant for slot #4 in DL control to UE 1002, as well as receives UL data only or UL data with UL control (e.g., HARQ-ACK for DL, UL sounding) from UE 1002. In slot #4, eNB 1001 does not send any DL PHY signaling to notify slot type. As a result, UE 1002 treats this slot either as a type 2 slot (UL-ALL) or as a blank slot. If the UE has not received any UL grant for a slot, where there is no DL PHY signaling indicating slot type, then this slot is treated as a blank slot. If the UE has received an UL grant for the slot (e.g., the UL grant in slot #3), then this slot is treated as a type 2 slot (UL-ALL), and accordingly, UE 1002 transmits uplink data only or uplink data with uplink control (e.g., HARQ-ACK for DL, UL sounding) in slot #4.

Note that there are different mechanisms for the physical layer signaling for slot type. One example is to have a separate physical-layer signaling for DL-only, DL-major & UL-major slot types only if this separate physical-layer signaling is a broadcasting/multicasting signaling and can only indicate the slot type for current slot. A second example is to have a unicast physical-layer signaling for all four slot types and it could be a new field in DL scheduler and UL grant to indicate the slot type for the scheduled slot. A third example is to have a unicast physical-layer signaling for all four slot types and it could be a new field in DL scheduler and UL grant to indicate the slot type for one or multiple slots, which may not include the current slot.

The base station can dynamically changing frame structure based on current system needs. For example, in step 1021, eNB 1001 determines the current system needs, e.g., DL/UL radio, latency requirements, etc. and thereby determining the subsequent slot types accordingly. Furthermore, with the flexible frame structure, eNB 1001 can simultaneously serve multiple UEs without introducing additional delay. For example, in slot # K, if UE 1002 has DL data to be scheduled and UE 1003 has HARQ-ACK for DL data in slot # K−1. DL-major slot type 3 can be used to accommodate DL scheduler and corresponding DL data for UE 1002 and UL control for HARQ-ACK for UE 1003 in slot K. For another example, in slot # K+1, if UE 1002 has UL data to be scheduled in slot # K+2 and UE 1003 is scheduled to transmit UL data, UL-major slot type 4 can be used to accommodate both UL grant for UE 1002 and UL data for UE 1003 in slot # K+1. If the slot type can be either DL-all or UL-all only, then one of the UEs needs to be delayed by at least one slot in the above two examples.

Figure 11:
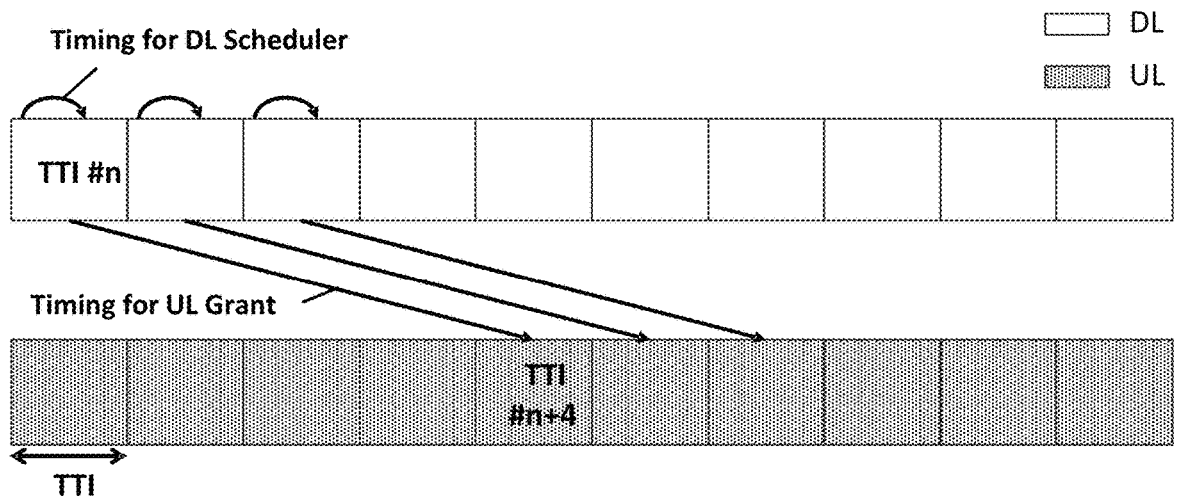
FIG. 11 illustrates one example of timing for resource allocation in FDD licensed spectrum for eMBB.

FIG. 11 illustrates one example of timing for resource allocation in FDD licensed spectrum for eMBB. In the example of FIG. 11, the transmission time interval (TTI) is 0.25 ms, e.g., one slot. For eMBB service, the timing for resource allocation, e.g., both downlink scheduler and uplink grant is not as critical as ULL service. As indicated in FIG. 11, the timing for downlink scheduler is in the same TTI. For example, if DL data transmission occurs in TTI # n, then its corresponding downlink scheduler is also in TTI # n. The timing for UL grant is four TTIs. For example, if UL data transmission occurs in TTI # n+4, then its corresponding uplink grant is in TTI # n.

Figure 12:
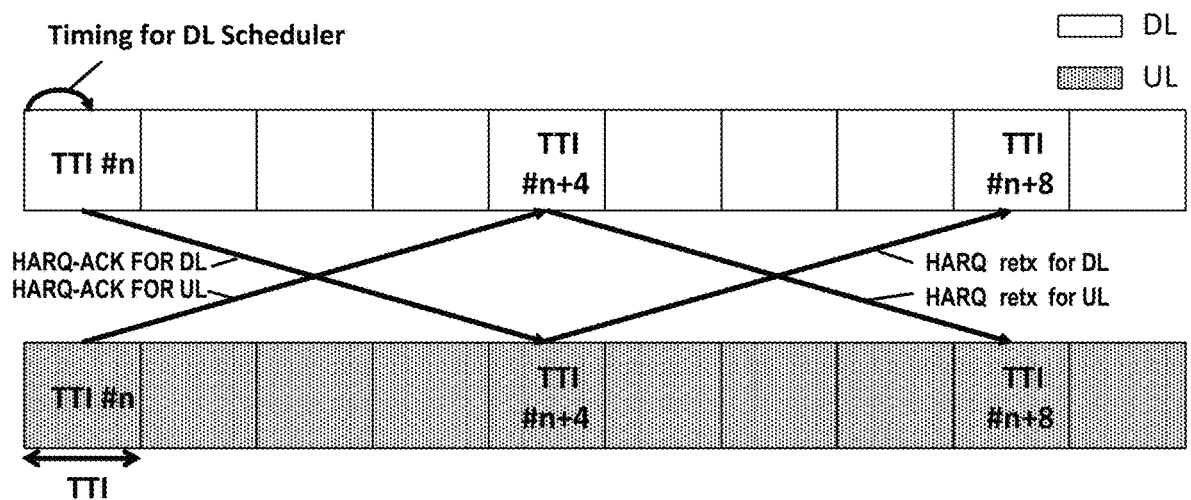
FIG. 12 illustrates one example of timing for HARQ operation in FDD licensed spectrum for eMBB.

FIG. 12 illustrates one example of timing for HARQ operation in FDD licensed spectrum for eMBB. In the example of FIG. 12, the transmission time interval (TTI) is 0.25 ms, e.g., one slot. For eMBB service, the timing for HARQ operation, e.g., HARQ-ACK and HARQ retransmission are not as critical as ULL service. As indicated in FIG. 12, the timing for HARQ ACK and HARQ retransmission is four and eight TTIs. For example, if the first DL data transmission occurs in TTI # n, then its HARQ-ACK for DL is in TTI # n+4, and its HARQ retransmission for DL is in TTI # n+8. Similarly, if the first UL data transmission occurs in TTI # n, then its HARQ-ACK for UL is in TTI # n+4, and its HARQ retransmission for UL is in TTI # n+8.

Figure 13:
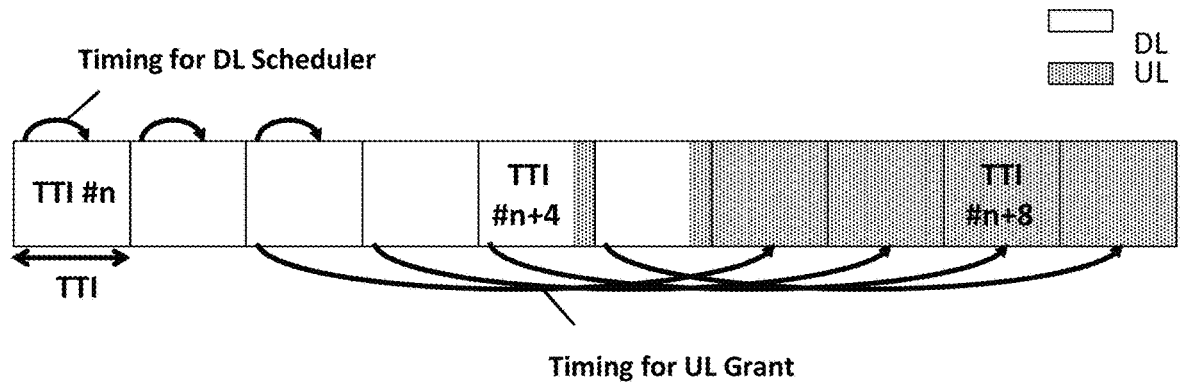
FIG. 13 illustrates one example of timing for resource allocation in TDD licensed spectrum for eMBB.

FIG. 13 illustrates one example of timing for resource allocation in TDD licensed spectrum for eMBB. In the example of FIG. 13, the transmission time interval (TTI) is 0.25 ms, e.g., one slot. For eMBB service, the timing for resource allocation, e.g., both downlink scheduler and uplink grant is not as critical as ULL service. As depicted in FIG. 13, the timing for downlink scheduler is in the same TTI. For example, if DL data transmission occurs in TTI # n, then its corresponding downlink scheduler is also in TTI # n. The timing for UL grant is four TTIs. For example, if UL data transmission occurs in TTI # n+8, then its corresponding uplink grant is in TTI # n+4. Furthermore, in TDD licensed spectrum, the slot type is flexible and can be dynamically configured to meet the DL/UL ratio as well as the timing requirements for resource allocation.

Figure 14:
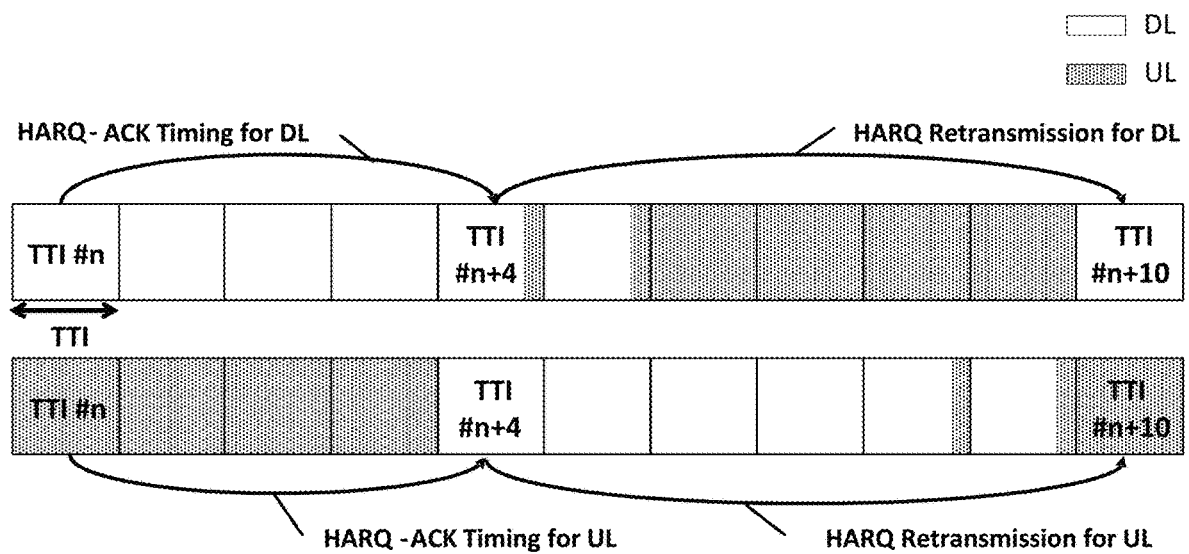
FIG. 14 illustrates one example of timing for HARQ operation in TDD licensed spectrum for eMBB.

FIG. 14 illustrates one example of timing for HARQ operation in TDD licensed spectrum for eMBB. In the example of FIG. 14, the transmission time interval (TTI) is 0.25 ms, e.g., one slot. For eMBB service, the timing for HARQ operation, e.g., HARQ-ACK and HARQ retransmission are not as critical as ULL service. As depicted in FIG. 14, for DL transmission, the timing for HARQ ACK is four TTIs. For example, if the first DL data transmission occurs in TTI # n, then its HARQ-ACK for DL is in TTI # n+4. The corresponding $1^{st}$ HARQ retransmission can be decided by the eNB, considering asynchronous HARQ operation. For example, the $1^{st}$ HARQ retransmission for DL is in TTI # n+10. Similarly, as depicted if FIG. 14, for UL transmission, the timing for HARQ ACK is four TTIs. For example, if the first UL data transmission occurs in TTI # n, then its HARQ-ACK for UL is in TTI # n+4. The corresponding $1^{st}$ HARQ retransmission for UL can be decided by the eNB, considering asynchronous HARQ operation. For example, the $1^{st}$ HARQ retransmission is in TTI # n+10.

Figure 15:
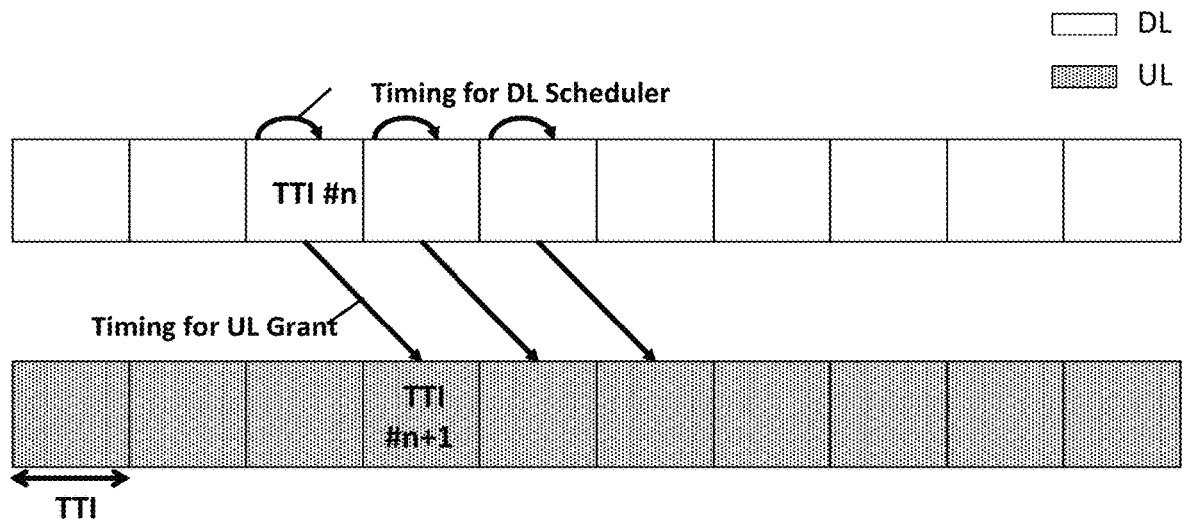
FIG. 15 illustrates one example of timing for resource allocation in FDD licensed spectrum for ULL.

FIG. 15 illustrates one example of timing for resource allocation in FDD licensed spectrum for ULL. In the example of FIG. 15, the transmission time interval (TTI) is 0.25 ms, e.g., one slot. For ULL service, the timing for resource allocation, e.g., both downlink scheduler and uplink grant is critical for latency performance. As indicated in FIG. 15, the timing for downlink scheduler is in the same TTI. For example, if DL data transmission occurs in TTI # n, then its corresponding downlink scheduler is also in TTI # n. The timing for UL grant is one TTI. For example, if UL data transmission occurs in TTI # n+1, then its corresponding uplink grant is in TTI # n.

Figure 16:
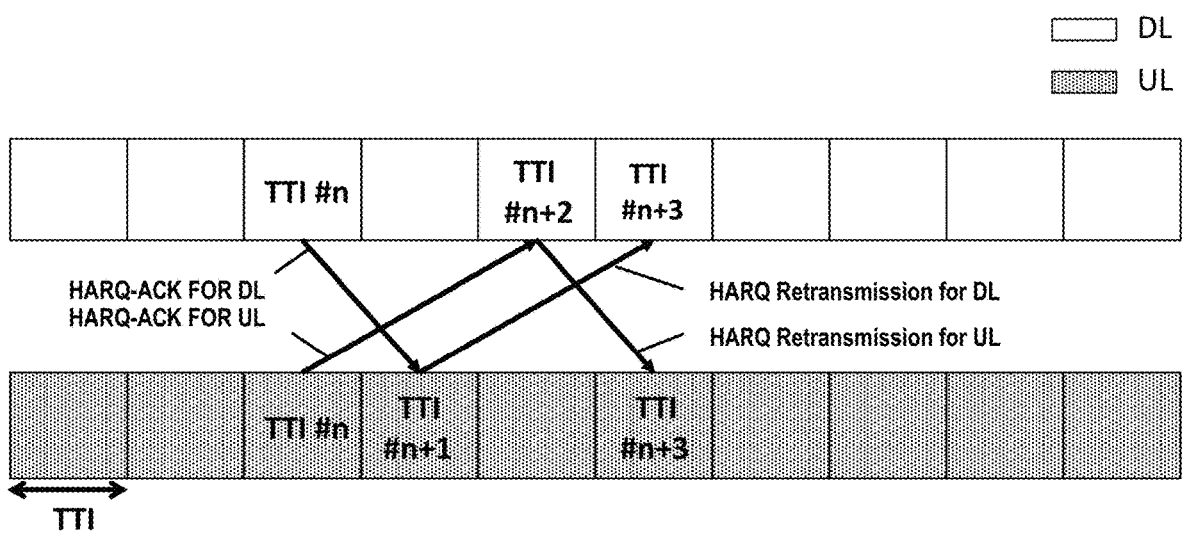
FIG. 16 illustrates one example of timing for HARQ operation in FDD licensed spectrum for ULL.

FIG. 16 illustrates one example of timing for HARQ operation in FDD licensed spectrum for ULL. In the example of FIG. 16, the transmission time interval (TTI) is 0.25 ms, e.g., one slot. For ULL service, the timing for HARQ operation, e.g., HARQ-ACK and HARQ retransmission are critical latency performance. As indicated in FIG. 16, the timing for HARQ ACK and HARQ retransmission is one and three TTIs. For example, if the first DL data transmission occurs in TTI # n, then its HARQ-ACK for DL is in TTI # n+1, and its HARQ retransmission for DL is in TTI # n+3. Similarly, if the first UL data transmission occurs in TTI # n, then its HARQ-ACK for UL is in TTI # n+1, and its HARQ retransmission for UL is in TTI # n+3.

Figure 17:
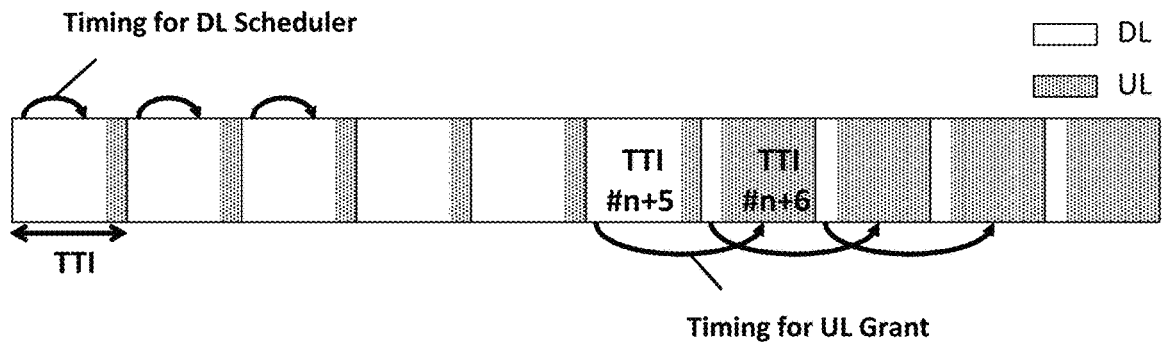
FIG. 17 illustrates one example of timing for resource allocation in TDD licensed spectrum for ULL.

FIG. 17 illustrates one example of timing for resource allocation in TDD licensed spectrum for ULL. In the example of FIG. 17, the transmission time interval (TTI) is 0.25 ms, e.g., one slot. For ULL service, the timing for resource allocation, e.g., both downlink scheduler and uplink grant is critical for latency performance. As depicted in FIG. 17, the timing for downlink scheduler is in the same TTI. For example, if DL data transmission occurs in TTI # n, then its corresponding downlink scheduler is also in TTI # n. The timing for UL grant is one TTI. For example, if UL data transmission occurs in TTI # n+6, then its corresponding uplink grant is in TTI # n+5. Furthermore, in TDD licensed spectrum, the slot type is flexible and can be dynamically configured to meet the DL/UL ratio as well as the timing requirements for resource allocation.

Figure 18:
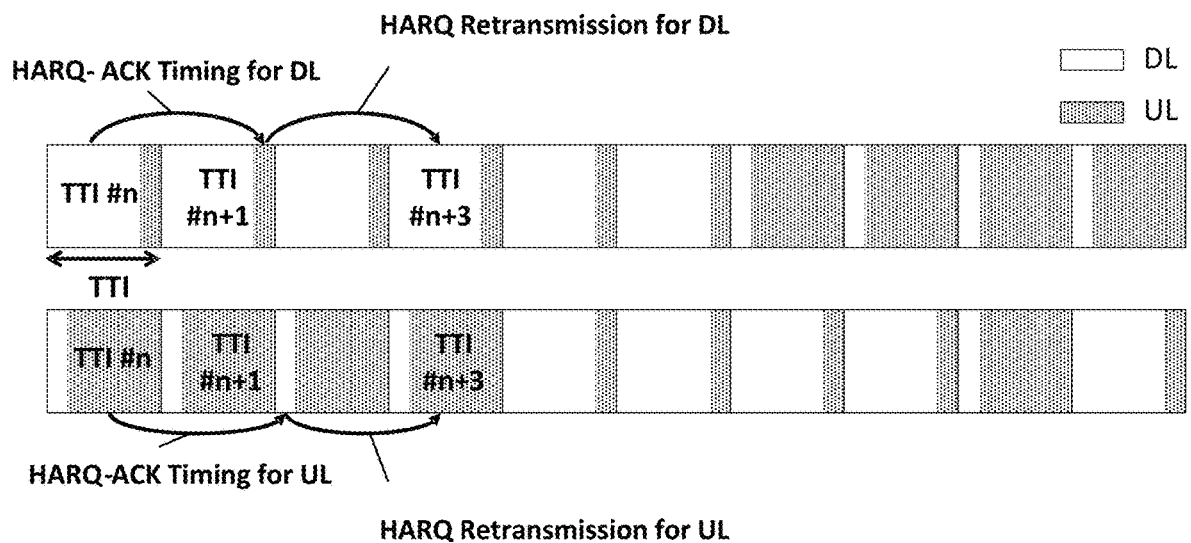
FIG. 18 illustrates one example of timing for HARQ operation in TDD licensed spectrum for ULL.

FIG. 18 illustrates one example of timing for HARQ operation in TDD licensed spectrum for ULL. In the example of FIG. 18, the transmission time interval (TTI) is 0.25 ms, e.g., one slot. For ULL service, the timing for HARQ operation, e.g., HARQ-ACK and HARQ retransmission are critical latency performance. As depicted in FIG. 18, for DL transmission, the timing for HARQ ACK is one TTI. For example, if the first DL data transmission occurs in TTI # n, then its HARQ-ACK for DL is in TTI # n+1. The corresponding $1^{st}$ HARQ retransmission can be decided by the eNB, considering asynchronous HARQ operation. For example, the $1^{st}$ HARQ retransmission for DL is in TTI # n+3. Similarly, as depicted if FIG. 18, for UL transmission, the timing for HARQ ACK is one TTI. For example, if the first UL data transmission occurs in TTI # n, then its HARQ-ACK for UL is in TTI # n+1. The corresponding $1^{st}$ HARQ retransmission for UL can be decided by the eNB, considering asynchronous HARQ operation. For example, the $1^{st}$ HARQ retransmission is in TTI # n+3.

Figure 19:
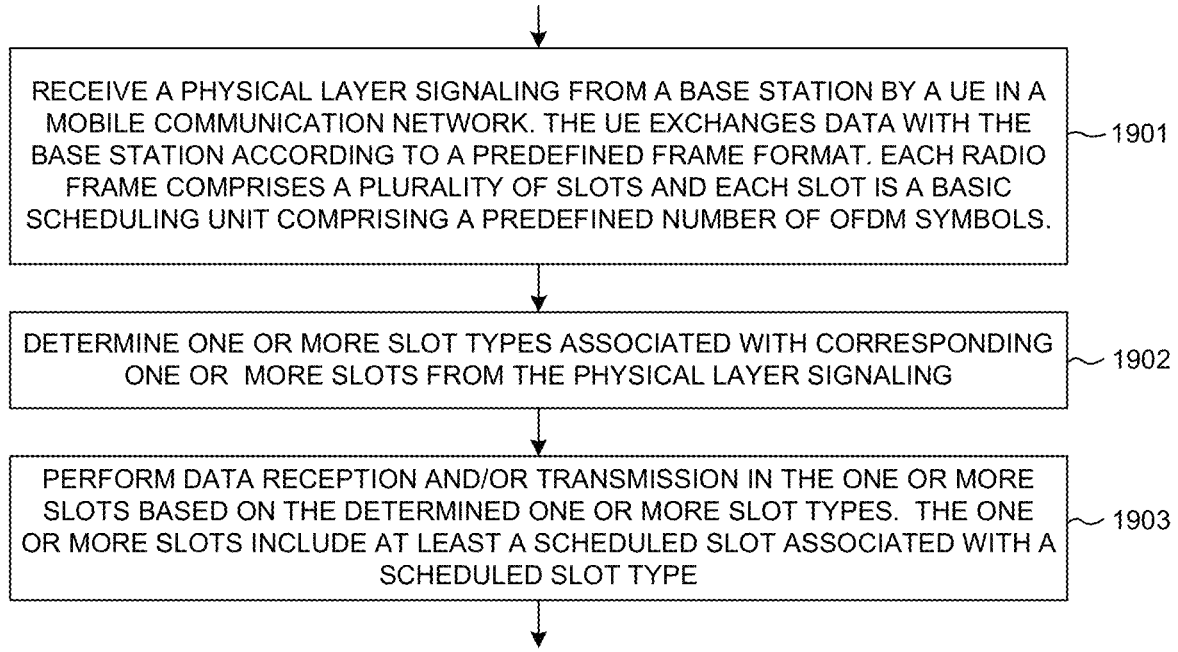
FIG. 19 is a flow chart of a method of dynamically configuring slot type with flexible frame structure from UE perspective in accordance with one novel aspect.

FIG. 19 is a flow chart of a method of dynamically configuring slot type with flexible frame structure from UE perspective in accordance with one novel aspect. In step 1901, a UE receives a physical layer signaling from a base station in a mobile communication network. The UE exchanges data with the base station according to a predefined radio frame format, each radio frame comprises a plurality of slots, and each slot is a basic scheduling unit comprising a predefined number of OFDM symbols. In step 1902, the UE determines one or more slot types associated with corresponding one or more slots from the physical layer signaling. In step 1903, the UE performs data reception and/or transmission in the one or more slots based on the determined one or more slot types, wherein the one or more slots include at least a scheduled slot associated with a scheduled slot type.

Figure 20:
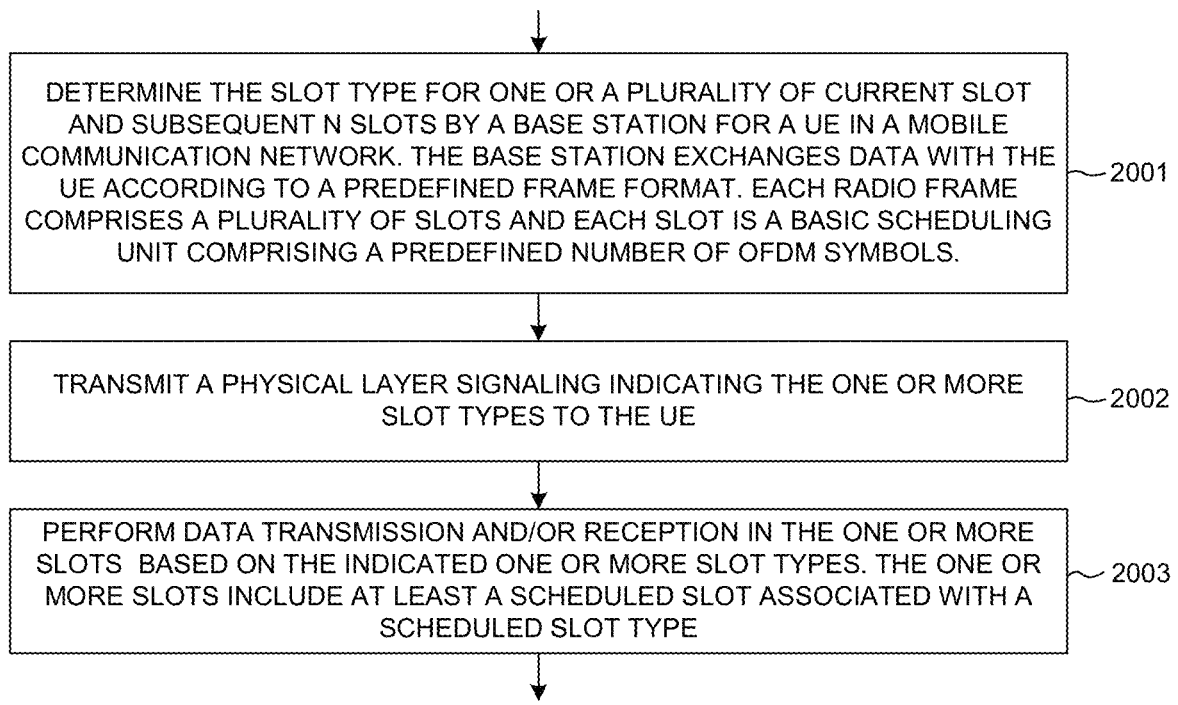
FIG. 20 is a flow chart of a method of dynamically configuring slot type with flexible frame structure from eNB perspective in accordance with one novel aspect.

FIG. 20 is a flow chart of a method of dynamically configuring slot type with flexible frame structure from base station perspective in accordance with one novel aspect. In step 2001, a base station determines one or more slot types associated with corresponding one or more slots for a user equipment (UE) in a mobile communication network. The base station exchanges data with the UE according to a predefined radio frame format, each radio frame comprises a plurality of slots, and each slot is a basic scheduling unit comprising a predefined number of OFDM symbols. In step 2002, the base station transmits a physical layer signaling indicating the one or more slot types to the UE. In step 2003, the base station performs data transmission and/or reception in the one or more slot types based on the indicated one or more slots types, the one or more slots include at least a scheduled slot associated with a scheduled slot type.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a physical layer signaling from a base station by a user equipment (UE) in a mobile communication network, wherein the UE exchanges data with the base station according to a predefined radio frame format, wherein each radio frame comprises a plurality of slots, and wherein each slot is a basic scheduling unit comprising a predefined number of OFDM symbols;
   determining one or more slot types associated with corresponding one or more slots based on the physical layer signaling; and
   performing data reception or transmission with the base station in the one or more slots based on the determined one or more slot types, wherein the one or more slots include at least a scheduled slot associated with a scheduled slot type, wherein the scheduled slot type belongs to one of four predefined slot types comprising an all-downlink (DL-all) type, an all-uplink (UL-all) type, a DL-major type, and an UL-major type.

2. The method of claim 1, wherein a DL-all type slot comprises all DL OFDM symbols, an UL-all type slot comprises all UL OFDM symbols, a DL-major type slot comprises more DL OFDM symbols than UL OFDM symbols, an UL-major type slot comprises more UL OFDM symbols than DL OFDM symbols.

3. The method of claim 1, wherein the scheduled slot type is the DL-major type, wherein the UE receives downlink data and transmits uplink control information including sounding or HARQ-ACK in the scheduled slot.

4. The method of claim 1, wherein the scheduled slot type is the UL-major type, wherein the UE transmits uplink data and receives downlink control information including scheduling or HARQ-ACK in the scheduled slot.

5. The method of claim 1, wherein the UE exchanges data transmission with the base station in slot # n, wherein the UE exchanges an HARQ-ACK with the base station in slot #(n+m), and wherein m is a positive integer.

6. The method of claim 1, wherein the UE receives DL scheduler and DL data in the same slot, wherein the UE receives UL scheduler in slot #(n-m) and transmits UL data in slot # n, and wherein m is a positive integer.

7. A user equipment (UE), comprising:
   a receiver that receives a physical layer signaling from a base station in a mobile communication network, wherein the UE exchanges data with the base station according to a predefined radio frame format, wherein each radio frame comprises a plurality of slots, and wherein each slot is a basic scheduling unit comprising a predefined number of OFDM symbols;
   a slot configuration circuit that determines one or more slot types associated with corresponding one or more slots from the physical layer signaling; and
   a transceiver that performs data reception or transmission with the base station in the one or more slots based on the determined one or more slot types, wherein the one or more slots include at least a scheduled slot associated with a scheduled slot type, wherein the scheduled slot type belongs to one of four predefined slot types comprising an all-downlink (DL-all) type, an all-uplink (UL-all) type, a DL-major type, and an UL-major type.

8. The UE of claim 7, wherein a DL-all type slot comprises all DL OFDM symbols, an UL-all type slot comprises all UL OFDM symbols, a DL-major type slot comprises more DL OFDM symbols than UL OFDM symbols, an UL-major type slot comprises more UL OFDM symbols than DL OFDM symbols.

9. The UE of claim 7, wherein the scheduled slot type is the DL-major type, wherein the UE receives downlink data and transmits uplink control information including sounding or HARQ-ACK in the scheduled slot.

10. The UE of claim 7, wherein the slot type is the UL-major type, wherein the UE transmits uplink data and receives downlink control information including scheduling or HARQ-ACK in the scheduled slot.

11. The UE of claim 7, wherein the UE exchanges data transmission with the base station in slot # n, wherein the UE exchanges an HARQ-ACK with the base station in slot #(n+m), and wherein m is a positive integer.

12. The UE of claim 7, wherein the UE receives DL scheduler and DL data in the same slot, wherein the UE receives UL scheduler in slot #(n-m) and transmits UL data in slot # n, and wherein m is a positive integer.

13. A method comprising:
   determining one or more slot types associated with corresponding one or more slots by a base station for a user equipment (UE) in a mobile communication network, wherein the base station exchanges data with the UE according to a predefined radio frame format, wherein each radio frame comprises a plurality of slots, and wherein each slot is a basic scheduling unit comprising a predefined number of OFDM symbols;
   transmitting a physical layer signaling indicating the one or more slot types to the UE; and
   performing data transmission or reception with the UE in the one or more slots based on the indicated one or more slot types, wherein the one or more slots include at least a scheduled slot associated with a scheduled slot type, wherein the scheduled slot type belongs to one of four predefined slot types comprising an all-downlink (DL) type, an all-uplink (UL) type, a DL-major type, and an UL-major type.

14. The method of claim 13, wherein an all-DL type slot comprises all DL OFDM symbols, an all-UL type slot comprises all UL OFDM symbols, a DL-major type slot comprises more DL OFDM symbols than UL OFDM symbols, an UL-major type slot comprises more UL OFDM symbols than DL OFDM symbols.

15. The method of claim 13, wherein the scheduled slot type is the DL-major type, wherein the base station transmits downlink data and receives uplink control information including sounding or HARQ-ACK in the scheduled slot.

16. The method of claim 13, wherein the scheduled slot type is the UL-major type, wherein the base station receives uplink data and transmits downlink control information including scheduling or HARQ-ACK in the scheduled slot.

17. The method of claim 13, wherein the base station exchanges data transmission with the UE in slot # n, wherein the base station exchanges an HARQ-ACK with the UE in slot #(n+m), and wherein m is a positive integer.

18. The method of claim 13, wherein the base station transmits DL scheduler and transmits DL data in the same slot, wherein the base station transmits UL scheduler in slot #(n-m) and receives UL data in slot # n, and wherein m is a positive integer.

* * * * *